UNITED STATES PATENT OFFICE.

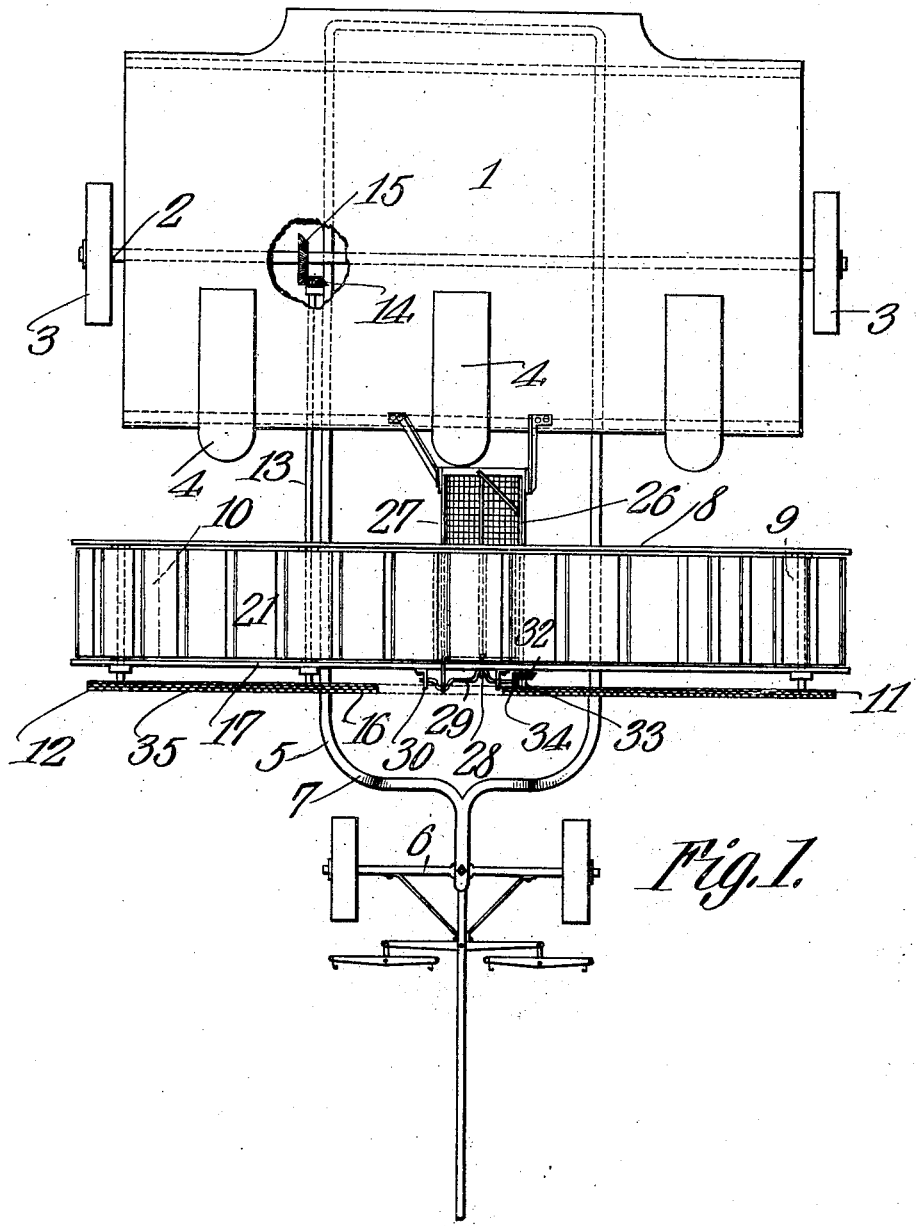

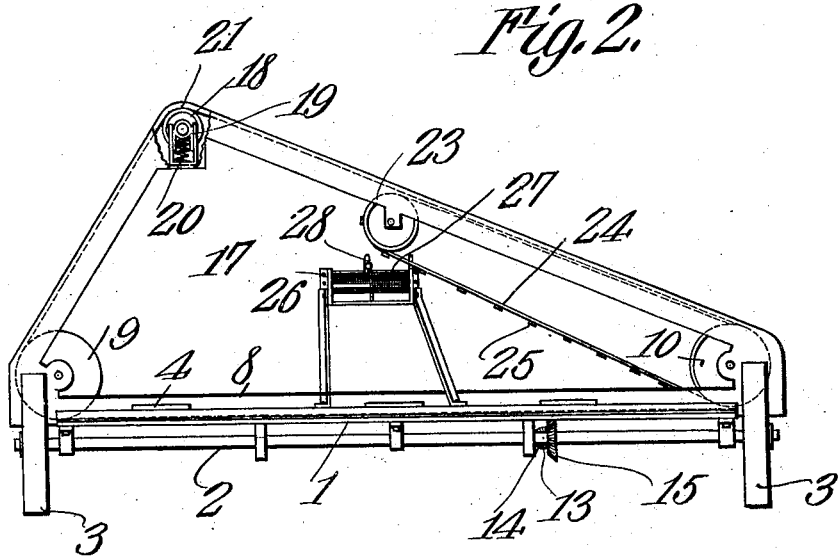
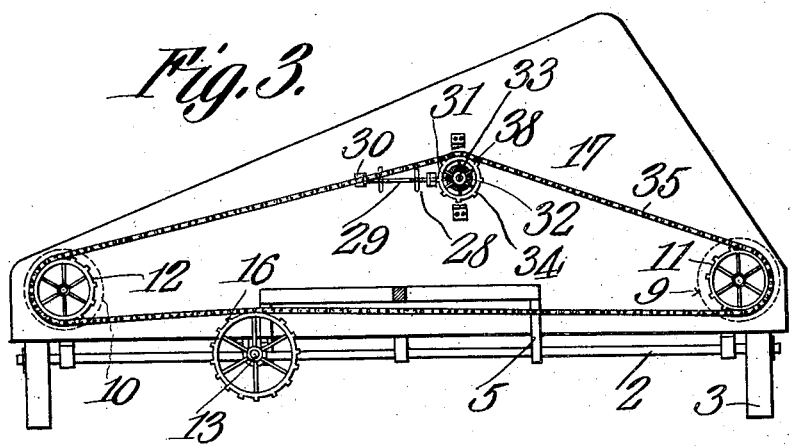

SAMUEL GEIGEL, OF CARBONDALE, COLORADO.

MACHINE FOR PICKING POTATOES.

No. 909,581.   Specification of Letters Patent.   Patented Jan. 12, 1909.

Application filed April 14, 1908. Serial No. 427,079.

*To all whom it may concern:*

Be it known that I, SAMUEL GEIGEL, a citizen of the United States, residing at Carbondale, in the county of Garfield and State of Colorado, have invented a new and useful Machine for Picking Potatoes, of which the following is a specification.

This invention has relation to machines for picking potatoes and it consists in the novel construction and arrangement of its parts as hereinafter shown and described.

The object of the invention is to provide a machine adapted to carry one or more persons who recline in lying posture and pick potatoes from the surface of the ground and deposit the same in a trough in which operates a conveyer. The potatoes are caught up by the conveyer and elevated and passed into a sorter in which they are separated into grades and from which they may be passed into buckets. By providing such a machine the fatigue and discomfort incident to stooping and carrying heavy buckets or receptacles containing the vegetable is avoided.

Figure 1 is a top plan view of the elevator. Fig. 2 is a rear end view of the same. Fig. 3 is a front end view of the same. Fig. 4 is a transverse sectional view of a belt used upon the elevator, and Fig. 5 is a longitudinal sectional view of a portion of said belt.

The machine consists of the platform 1 which is mounted upon the axle 2 which in turn is supported by the traction wheels 3. The axle 2 turns with the wheels 3. A series of pallets 4 is arranged upon the forward portion of the platform 1 and the yoke 5 projects beyond the forward edge of the said platform. The truck 6 supports the forward portion of the yoke 5 and the forward portions of the arms of the said yoke are upwardly bowed as at 7 in order that the wheels of the truck 6 may pass thereunder when the machine is being turned. The trough 8 is mounted upon the yoke 5 and is provided at its ends with the drums 9 and 10 journaled for rotation. The shaft of the drum 9 is provided with a sprocket wheel 11, and the shaft of the drum 10 is provided with a sprocket wheel 12. The shaft 13 is journaled for rotation and lies transversely across the trough 8. The rear end of the shaft 13 is provided with a beveled pinion 14 which meshes with the gear wheel 15 mounted upon the axle 2. The sprocket wheel 16 is mounted upon the forward end of the shaft 13. The frame 17 is mounted upon the trough 8 and is provided with an anticlinal upper edge. The drum 18 is journaled in the boxes 19 which rest upon the springs 20 and are adapted to move vertically. The belt 21 traverses the length of the trough 8 and passes around the drums 9 and 10 and over the drum 18. The said belt 21 is provided upon its outer side with the spring steel slats 22. The drum 23 is journaled for rotation in the upper portion of the frame 17 and the belt 24 passes around the drum 23 and the drum 10. The belt 24 is provided upon its exterior with the slats 25, preferably of wood.

The sorter 26 is supported at one end upon the platform 1 and at its opposite end by the forward portion of the frame 17 and lies under the upper end of the belt 24. The said sorter is held in an inclined position and is provided with a reciprocating screen or sieve 27. The pitman 28 is pivotally connected with said sieve at one end and is journaled at its opposite end upon the crank of the shaft 29. Said shaft is journaled for rotation in the lugs 30 mounted upon the forward portion of the frame 17. The beveled pinion 31 is mounted upon the shaft 29 and meshes with the beveled pinion 32 carried by the stub shaft 33. The sprocket wheel 34 is mounted upon the stub shaft 33 and lies in the same plane with the sprocket wheels 11, 12 and 16. The chain 35 passes under the sprocket wheels 11 and 12 and over the sprocket wheel 16 and the sprocket wheel 34.

The operation of the machine is as follows: One or more persons recline upon the pallets 4 and as the machine is drawn along the ground they pick up the potatoes and deposit them in the trough 8 upon the inner surface of the lower portion of the belt 21. At the same time the traction wheels 3 rotate the axle 2 which through the wheels 14 and 15 rotates the shaft 13. Through the sprocket wheel 16 the chain 35 is moved in an orbit about the wheels 11, 12 and 34. Thus movement is transmitted to the belts 21 and 24. The adjacent sides of the belts 21 and 24 move in the same direction and the potatoes which are deposited upon the lower portion of the belt 21 are carried by the said belt 21 toward the drum 10. At the drum 10 the potatoes are picked up by the belts 21 and 24 and are carried along the outer side of the upper portion of the belt 24 and the inner side of the upper portion of the belt 21 to the upper end of the belt 24 from whence they are deposited in the sorter 26. As the sieve 27 in the said sorter is reciprocated the potatoes are separated into classes of larger and smaller sizes in the usual manner.

Having thus described my invention, what is claimed as new and desired to be secured by Letters Patent is:

1. In a machine as described, a trough, coöperating belts operating in the trough, one describing an orbit within the other, and cross-slats mounted upon the outer side of the inner belt and the outer side of the outer belt.

2. In a machine as described, a trough, coöperating belts operating in the trough and describing orbits one within the other, rigid slats mounted upon the inner belt and flexible slats mounted upon the outer belt.

3. A machine as described comprising a platform, a trough spaced from the same, an elevating and delivery means operating in the trough and a pallet mounted upon the platform and being disposed toward the trough.

4. A machine as described, comprising a wheel-mounted platform, a yoke attached thereto, a truck supporting said yoke, a trough mounted upon the yoke and being spaced from the platform and an elevating and delivery means operating in the trough.

In testimony that I claim the foregoing as my own, I have hereto affixed my signature in the presence of two witnesses.

SAMUEL GEIGEL.

Witnesses:
A. T. THOMSON,
D. W. THORES.